United States Patent
Ueno

(10) Patent No.: US 6,501,210 B1
(45) Date of Patent: Dec. 31, 2002

(54) POSITIONING MECHANISM HAVING ELONGATE BENDING ELEMENTS ORIENTED PERPENDICULAR TO THE DIRECTION OF MOVEMENT

(75) Inventor: Toshiaki Ueno, Yokohama (JP)

(73) Assignee: Hewlett-Packard Company, Palo Alto, CA (US)

( * ) Notice: Subject to any disclaimer, the term of this patent is extended or adjusted under 35 U.S.C. 154(b) by 667 days.

(21) Appl. No.: 08/924,857

(22) Filed: Aug. 29, 1997

(30) Foreign Application Priority Data

Sep. 10, 1996 (JP) .............................. 8-261292

(51) Int. Cl.[7] .............................. G11B 9/00; G11B 7/34; H02N 2/00
(52) U.S. Cl. ........................................ 310/331; 310/330
(58) Field of Search .......................... 310/328, 330–332

(56) References Cited

U.S. PATENT DOCUMENTS

| | | | |
|---|---|---|---|
| 3,304,773 A | * 2/1967 | Rogallo | 310/331 X |
| 3,526,726 A | * 9/1970 | Corbett et al. | 310/331 X |
| 4,520,570 A | 6/1985 | Bednorz et al. | 33/180 R |
| 4,601,539 A | * 7/1986 | Watanabe | 310/369 X |
| 4,634,884 A | 1/1987 | Hayashimoto et al. | 250/578 |
| 5,089,740 A | * 2/1992 | Ono | 310/328 |
| 5,170,089 A | * 12/1992 | Fulton | 310/328 |
| 5,297,130 A | 3/1994 | Tagawa et al. | 369/126 |
| 5,508,838 A | * 4/1996 | Shimizu et al. | 310/331 X |
| 5,705,878 A | * 1/1998 | Lewis et al. | 310/328 |

FOREIGN PATENT DOCUMENTS

| | | | |
|---|---|---|---|
| EP | 0 253 375 A2 | 1/1988 | H01L/41/08 |
| EP | 0 481 499 A2 | 4/1992 | G11B/9/08 |

OTHER PUBLICATIONS

Kenji Uchino, "Piezoelectric and Electrostrictive Actuators", Japan Industry Engineering Center, Morikita Shuppan, 1996, pp. 94–102.

"5.25 Inch–Type Photomagnetic Disc System, its Average Access Time in Under 50ms" Mikkai Electronics, Apr. 18, 1998, No. 445.

Hiroshi Yamaura, "New Technology Report of Precision Engineering Laboratory", vol. 62, No. 9, 1996, pp. 1238–1241.

Uchino, Kenji; "Piezoelectric and Electrostrictive Actuators", Japan Industry Engineering Center, Morikita Shuppan, pp. 94–102, 1986.

"5.25 Inch–Type Photomagnetic Disc System, its Average Access Time is under 50ms", Nikkei Electronics, Apr. 18, 1988, No. 445.

Yamaura, Hiroshi; "New Technology of Magnetic Head Positioners", Technical Report of Precision Engineering Laboratory, vol. 62, No. 9, pp. 1238–1241, 1996.

* cited by examiner

Primary Examiner—Karl Tamai

(57) ABSTRACT

A positioning mechanism for positioning in a direction of movement. The positioning mechanism comprises a first member and a second member movably mounted relative to one another, and additionally comprises an elongate bending element disposed between the first member and the second member, perpendicular to the direction of movement. The elongate bending element includes two end portions attached to the second member. A portion of the elongate bending element other than the end portions is coupled to the first member. The elongate bending element bends lengthways in response to an applied driving signal to move the first member relative to the second member in the direction of movement.

20 Claims, 7 Drawing Sheets

POSITIONING MECHANISM HAVING ELONGATE BENDING ELEMENTS ORIENTED PERPENDICULAR TO THE DIRECTION OF MOVEMENT

FIELD OF THE INVENTION

The present invention concerns a compact, high-precision positioning mechanism, and, in particular, a compact, high-precision positioning mechanism that is suitable for positioning objects in scanning probe microscopes, moving-medium type memory devices, micro-manipulators and the like.

BACKGROUND OF THE INVENTION

A scanning probe microscope determines the surface topology of a sample by measuring a physical parameter that exists between a probe tip and the surface of the sample. The parameter may be, for example, the capacitance or contact voltage between the probe tip and the surface, or the magnitude of a tunnelling current that flows between the probe tip and the surface. Such a scanning probe microscope is capable of measuring the physical parameter peculiar to an extremely small region of the surface of the sample. This region may have dimensions of the order of a few tens of nanometers. A moving medium-type memory device based on a scanning probe microscope can record a single bit in a region having a diameter of approximately 30 nm. A micro-manipulator based on a scanning probe microscope can work on a scale of several tens of nanometers.

In the type of scanning probe microscope in which the object whose surface topology is to be measured is caused to move relative to the probe tip, the object is typically mounted on a stage and the stage is moved. Moving the stage moves the object the same distance. Scanning probe microscopes require that the position of the object whose surface topology is to be measured, or the position of the stage, deviate from its target position by a distance that is smaller than the working scale of the microscope. A moving medium-type memory device requires that the position of the stage on which the memory medium is mounted deviate from its target position by a distance that is substantially smaller than the linear dimensions of the region of the memory medium in which one bit is recorded. Conventional positioning devices that perform this type of positioning may use piezoelectric elements as actuators. See, for example, U.S. Pat. No. 5,297,132 of Tagawa et al.

Conventional positioning devices that perform the type of positioning just described, such as the positioning device disclosed in the above-mentioned U.S. Pat. No. 5,297,132, may use piezoelectric elements as actuators. FIG. 1 shows a conventional positioning mechanism that uses stack-type piezoelectric elements as its actuators. The positioning mechanism shown in FIG. 1 is composed of the square stage 1, the inner frame 3 surrounding the stage 1, and the outer frame 5 surrounding the inner frame 3. The x-direction stack-type piezoelectric elements 7 and 9 are interposed between the stage and the inner frame, and the y-direction stack-type piezoelectric elements 11 and 13 are interposed between the inner frame and the outer frame. The inner suspension springs 15 disposed between the stage and the inner frame support the stage in the inner frame, The outer suspension springs 19 disposed between the inner frame and the outer frame support the inner frame in the outer frame. The x-direction piezoelectric elements 7 and 9 are located at the centers of two sides of the inner frame that are opposite one another in the x-direction. The y-direction piezoelectric elements 11 and 13 are located at the centers of two sides of the inner frame that are opposite one another in the y-direction. The sides of the inner frame on which the y-direction piezoelectric elements are located are orthogonal to the sides of the inner frame on which the x-direction piezoelectric elements are located.

The inner suspension springs 15 disposed between the stage 1 and the inner frame 3 are located on different opposed sides from those on which the x-direction piezoelectric elements 7 and 9 located. Two suspension springs are located on each of the opposed sides. The outer suspension springs 19 disposed between the inner frame and the outer frame 5 are located on different opposed sides from the opposed sides on which the y-direction stack-type piezoelectric elements 11 and 13 are located. Again, two suspension springs are located on each of the opposed sides.

The x-direction piezoelectric elements 7 and 9 cause the stage 1 to move in the x-direction shown in FIG. 1, and the y-direction piezoelectric elements 11 and 13 cause the stage and the inner frame 3 to move together in the y-direction shown in the same figure. Generally, stack-type piezoelectric elements require pre-loading to enable them to operate with adequate precision. Such pre-loading can be applied using springs (not shown), for example, located so that they resist the expansion and contraction forces generated by the piezoelectric elements. In the example shown in FIG. 1, pre-loading is generated simultaneously with the movement of the stage 1 or the inner frame 3 by pressing the x-direction stack-type piezoelectric elements 7 and 9 towards the stage 1 with a constant pressure, or by pressing the y-direction stack-type piezoelectric elements 11 and 13 towards the inner frame 3 with a constant pressure. When the x-direction stack-type piezoelectric elements 7 and 9 cause the stage 1 to move in the +x-direction, the piezoelectric element 7 is driven to cause it to expand, and the piezoelectric element 9 is driven to cause it to contract.

Movement of the stage 1 to any desired position in the XY plane in the conventional positioning mechanism described above requires that two stack-type piezoelectric elements be provided for each dimension of movement. In the example shown in FIG. 1, the stage is moved in two dimensions, so requires a total of four stack-type piezoelectric elements 7 through 13. A stack-type piezoelectric element can typically provide a maximum expansion or contraction of approximately 0.1% of the overall length of the element in the direction of movement. For example, a piezoelectric element with an overall length of 10 mm will provide a maximum expansion or contraction of approximately 10 $\mu$m. Accordingly, to move the stage 1 by approximately ±50 $\mu$m requires a stack-type piezoelectric element with a length of approximately 50 mm. Moreover, the length of the stack-type piezoelectric elements is aligned parallel to the direction of movement, so that the lengths of the stack-type piezoelectric elements add to the dimensions of the stage and the inner frame. The result of this is that the overall dimensions of a conventional positioning mechanism using stack-type piezoelectric elements for actuators exceed 100 mm. Consequently, the conventional positioning device just described is unsuitable for use in moving medium-type memory devices, where small size is especially required.

The suspension springs 19 should have a high compliance in their directions of movement and their compliance in the z-direction should be sufficiently low to enable them to support the moving structure composed of the inner frame 3, the stage 1 and the two stack-type piezoelectric elements 7 and 9 with little deflection in the z-direction. This requires that the suspension springs have a large thickness in the z-direction, and a very small width in the direction of movement. Suspension springs with such large aspect ratio are very difficult to fabricate. Furthermore, the mass of a moving structure having such large dimensions reduces the self-resonance frequency of the positioning mechanism. This makes it impossible to change the position of the stage 1 rapidly.

The use of lever and hinge structures that magnify the displacement provided by stack-type piezoelectric elements has been proposed to increase the range of movement provided by such actuators. However, such structures are complex and have low rigidity so that positioning mechanisms that employ them have a low self-resonance frequency. Such positioning mechanisms are therefore unsuitable for high-speed operation. Moreover, the levers used in such mechanisms generate unnecessary angular moments in directions different from the direction of movement. This reduces the precision of the positioning that can be obtained.

What is needed is a positioning mechanism that provides a range of movement of at least several tens of microns for use in scanning probe microscopes, moving medium-type memory devices, micro-manipulators and the like. This range of movement should be provided without increasing the overall size of the positioning mechanism. Moreover, it should be possible to form the positioning mechanism, including the movable element as an integral unit in a single substrate to reduce the cost mass-production.

SUMMARY OF THE INVENTION

The invention provides a positioning mechanism for positioning in a direction of movement. The positioning mechanism comprises a first member and a second member movably mounted relative to one another, and additionally comprises an elongate bending element disposed between the first member and the second member, perpendicular to the direction of movement. The elongate bending element includes two end portions attached to the second member. A portion of the elongate bending element other than the end portions is coupled to the first member. The elongate bending element bends lengthways in response to an applied driving signal to move the first member relative to the second member in the direction of movement.

The invention provides a positioning mechanism that has a range of movement of several tens of microns. The positioning mechanism may be used in such applications as a scanning-probe microscope, a moving medium-type memory device and a micro-manipulator. This range of movement is obtained without increasing the overall size of the apparatus in which the positioning mechanism is used. The compact size and large range of movement of the positioning mechanism are the result of using elongate bending elements disposed perpendicular to the direction of movement as actuators. These advantages are particularly the result of using bimorph bending elements as actuators.

The moving member of the positioning member is preferably supported by suspension springs. Electrically-conductive tracks can be located on the surface of the suspension springs to enable signals originating in the movable member to be connected to a circuit located outside the movable member.

The positioning device can be mass produced at low cost by forming the frame(s), suspension springs and movable member as an integral unit in a single substrate. The preferred material of the substrate is single-crystal silicon or a similar material.

A moving medium-type memory device that has the positioning mechanism built into its memory substrate or its probe substrate can have a high bit density. The bit density can be high because the effects of thermal expansion on the bit positions in the memory medium can be minimized by making the probe substrate and the memory substrate from the same material, such as single-crystal silicon. Because of the small size and light weight of the moving parts of the positioning mechanism, and because the elongate bending elements used in the positioning mechanism generate negligible forces in directions perpendicular to the direction of movement, the gap between the probe substrate and the memory substrate can be reduced to less than about two microns. Such a small gap further reduces the effects of thermal expansion and enables the bit density to be further increased.

In a moving medium-type memory device that has a positioning mechanism built into one of its substrates, and in which the positioning mechanism includes one elongate bending element for each of two orthogonal directions of movement, the probe substrate can be offset relative to the elongate bending elements mounted in the stage substrate. This reduces the size of the memory device.

DETAILED DESCRIPTION OF THE INVENTION

Figure 1:
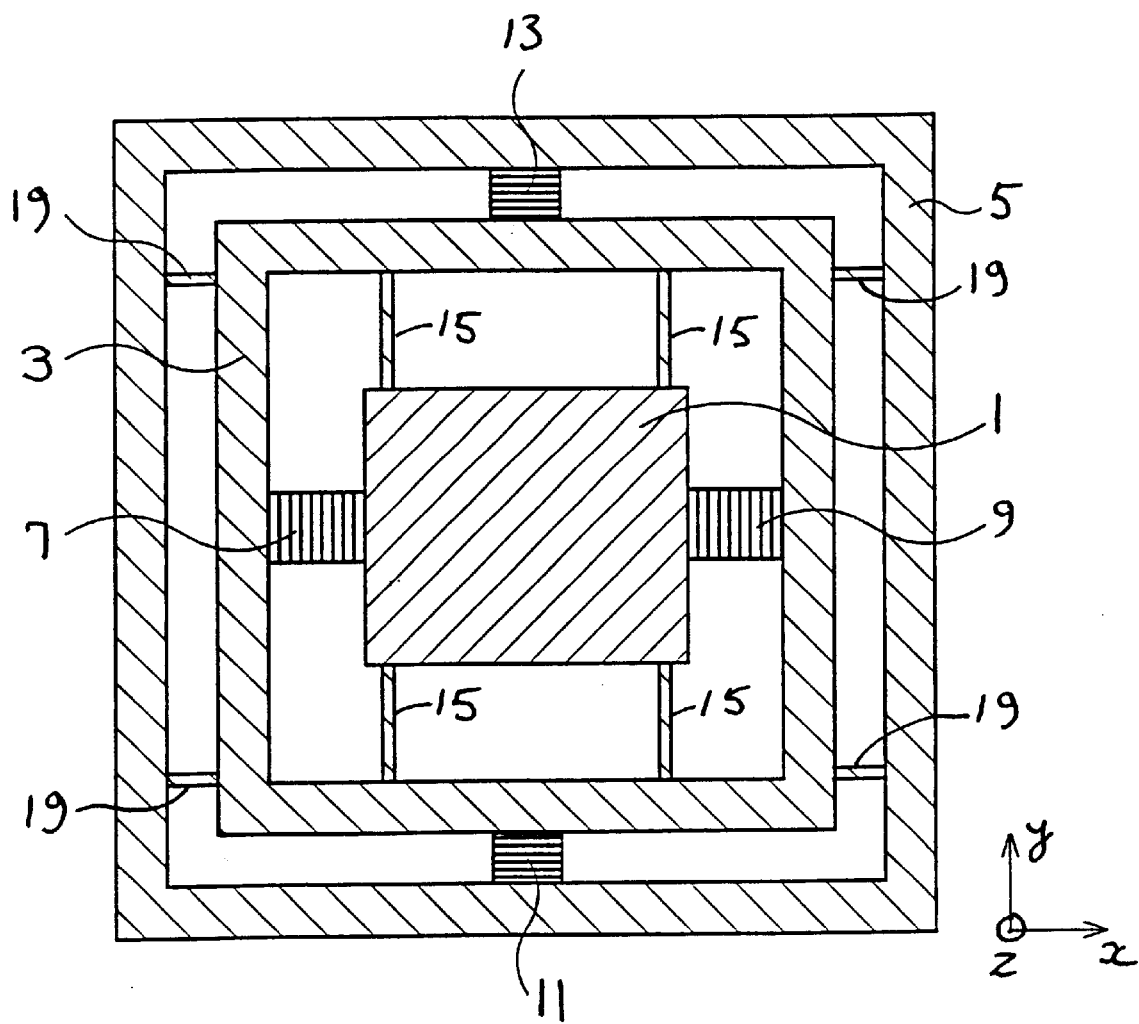
FIG. 1 shows a conventional positioning mechanism.

The positioning mechanism according to the invention includes a frame and a movable member. The movable member is capable of moving relative to the frame in a direction of movement. The positioning mechanism also includes an elongate bending element as its actuator. The elongate bending element is disposed perpendicular to the direction of movement and is attached to the frame at both of its end portions. A portion of the elongate bending element other than its end portions is coupled to the movable member. In response to an applied driving signal, the elongate bending element bends lengthways to assume a convex or concave shape relative to the movable member. The change in shape of the elongate bending element coupled to the movable member moves the movable member in the direction of movement.

When the elongate bending element bends lengthways, the portions of the elongate bending element other than its end portions move laterally relative to the end portions, i.e., the portions other than the end portions move in the direction of movement, perpendicular to the length of the bending element. The displacement of the central portion of the elongate bending element is normally the largest, so the central portion of the elongate bending element is preferably coupled to the movable member. However, other portions of the elongate bending element may alternatively be coupled to the movable member.

The elongate bending element may be coupled to the movable member by attaching it to the movable member. This enables the elongate bending element to move the movable member in both the positive and negative directions of movement. Alternatively, the elongate bending element may be coupled to the movable member by pressing the elongate bending element against the movable member. In this case, the elongate bending element can only positively move the movable member in the positive direction of movement, for example, and another device, such as a spring or another elongate bending element, is required to move the movable member in the negative direction of movement.

A bimorph bending element, a bimetallic bending element or a bending element made of a shape memory alloy are examples of elements that may be used as the elongate bending element. A bimorph bending element suitable for use as the elongate bending element is composed of elongate, thin layers of piezoelectric material bonded to the opposite major surfaces of a shim. The shim is a thin, elongate piece of a conductive, elastic material such as stainless steel or doped, single-crystal silicon. The piezoelectric layers have opposite directions of polarization relative to the shim. Lengthways bending of the bimorph bending element is accomplished by applying a driving voltage between the shim and electrodes located on the surfaces of the piezoelectric layers remote from the shim. A portion of the bimorph bending element other than its end portions, preferably its central portion, is coupled to the movable member. The movable member is then moved by applying the driving voltage to the bimorph bending element. The distance and direction of the resulting movement of the movable element depends on the magnitude and direction of the driving voltage.

As noted above, a thermally-actuated bending element such as a bimetallic bending element or a bending element formed from a shape memory alloy can be used as the elongate bending element, and the temperature of the thermally-actuated bending element is changed to move the movable member. The temperature of the thermally-actuated bending element may be changed by supplying electrical energy to a suitable heating element thermally coupled to the bending element. Alternatively, a Peltier element, thermally coupled to the thermally-actuated bending element, can be used to increase or decrease the temperature of the bending element. The direction of temperature change depends on the direction of current flow through the Peltier element.

The positioning mechanism may use a single elongate bending element to position the movable member in a single dimension. The end portions of the elongate bending element are attached to the frame and a portion of the elongate bending element other than the end portions attached to the frame is coupled to the movable member. Alternatively, the end portions of the elongate bending element may be attached to the movable member and a portion of the elongate bending element other than the end portions is coupled to the frame.

A complementary pair of elongate bending elements may optionally be substituted for the single elongate bending element just described. The elongate bending elements constituting the complementary pair are positioned on sides of the movable member that are opposite one another in the direction of movement and effectively clamp the movable member between them. The elongate bending elements constituting the complementary pair operate in a complementary way so that when one bends to assume a concave shape, for example, relative to the movable member, the other bends to assume a convex shape. The portion of each elongate bending element coupled to the movable member need only be pressed against the movable member to enable the complementary pair to move the movable member positively in both the positive and negative directions of movement.

It is desirable that the movable member be positively located in its movable relationship to the frame. In a preferred embodiment, this is accomplished by deploying a suspension spring at plural locations between the frame and the movable member. The suspension springs should be compliant in the direction of movement and should be rigid in directions other than the direction of movement.

The frame and the suspension springs may be fabricated as an integral unit from a single substrate. Preferably, the movable member, the frame and the suspension springs are all fabricated as an integral unit from a single substrate. The material of the substrate may be silicon, silicon dioxide ($SiO_2$), sapphire, lithium niobate ($LiNbO_3$), gallium arsenide (GaAs) or some other suitable material. Using single-crystal silicon as the substrate from which at least the frame and the suspension springs are fabricated enables the suspension springs to have a uniform compliance and a long service life. Multiple positioning mechanisms can be fabricated simultaneously from a large wafer of single-crystal silicon.

The positioning mechanism that provides positioning in two dimensions includes a second frame and a second elongate bending element in addition to the first frame and the first elongate bending element of the one-dimensional mechanism. The two-dimensional mechanism additionally positions the movable member in a second direction of movement orthogonal to the first direction of movement of the one-dimensional mechanism. The second frame supports the first frame in a way that permits the first frame to move relative to the second frame in the second direction of movement.

The second elongate bending element is aligned perpendicular to the second direction of movement and is attached to the second frame at both of its end portions. A portion of the second elongate bending element other than its end portions is coupled to the first frame. In response to an applied driving signal, the second elongate bending element bends lengthways to assume a convex or concave shape relative to the first frame. The change in shape of the elongate bending element coupled to the first frame moves the first frame, and, hence, the movable member, in the second direction of movement.

A complementary pair of second elongate bending elements similar to the complementary pair described above may optionally be substituted for of the second elongate bending element just described. The second elongate bending elements constituting the complementary pair are mounted on sides of the second frame that are opposite one another in the second direction of movement. When the positioning mechanism is used in a device that has probe tips, such as a moving medium-type memory device or the like, this arrangement enables the mechanism that includes the probe tips to be easily installed on the positioning mechanism.

Complementary pairs of elongate bending elements may be mounted on each of the first frame and the second frame. The movable member is clamped between the complementary pair of first elongate bending elements mounted on the first frame, and first frame is clamped between the complementary pair of second elongate bending elements mounted on the second frame. The portion of each first elongate bending element coupled to the movable member need only be pressed against the movable member to enable the complementary pair to move the movable member positively in both the positive and negative first direction of movement. The portion of each second elongate bending element coupled to the first frame need only be pressed against the first frame to enable the complementary pair to move the first frame positively in both the positive and negative second direction of movement.

It is desirable that the movable member be positively located in its movable relationship to the first frame, and that the first frame be positively located in its movable relationship to the second frame. In a preferred embodiment, this is accomplished by deploying a suspension spring at plural locations between the first frame and the movable member, and by deploying a suspension spring at plural locations between the second frame and the first frame. As with the one-dimensional positioning mechanism described above, the frames and the suspension springs may be formed as an integral unit from a single substrate. Preferably, the movable member, the frames and the suspension springs are all formed as an integral unit from a single substrate. The two-dimensional positioning mechanism may be fabricated from the same substrate materials as the one-dimensional positioning mechanism described above.

The conventional positioning mechanism shown in FIG. 1 uses two stack-type piezoelectric elements for each dimension of movement. The positioning mechanism according to the invention that uses one or two elongate bending elements for each dimension of movement provides a larger displacement, and is more compact and lower in mass than the conventional positioning mechanism. For example, when a bimorph bending element is used as the elongate bending element, the displacement of the central portion of the bimorph bending element varies according to the length and thickness of the element, but can easily be as much as 1% of the overall length of the bimorph bending element. A two-dimensional positioning mechanism having a range of movement of ±50 $\mu$m can easily be made using bimorph bending elements of approximately the same length as the sides of a 10 mm-square semiconductor chip. The bimorph bending elements are mounted parallel to two perpendicular sides of the semiconductor chip.

The width of a bimorph bending element that provides the range of movement just described is small—approximately 0.3 mm. Width is the dimension of the bimorph bending element in the direction of the movement of the element. The thickness of the bimorph bending elements is approximately 0.5 mm, which is comparable with the thickness of the semiconductor substrate from which the frames and moving member are fabricated. Thickness is the dimension of the bimorph bending element in the direction orthogonal to both the length and the direction of motion of the bimorph bending element. Making the thickness of the bimorph bending elements comparable with that of the semiconductor substrate enables silicon micro-machining techniques to be used to fabricate a positioning mechanism in which the movable member, the frames and the suspension springs are all formed as an integral unit from a single silicon substrate, as described above. Bimorph bending elements with a thickness comparable to the substrate allow the probe substrate to fully overlap the memory substrate in a memory device. Moreover, such bimorph bending elements are capable of generating sufficient force to move the memory substrate of a typical moving-medium memory device at sufficiently high speeds to enable such device to provide acceptable access times. Such bimorph bending elements are sufficiently compact that the entire positioning mechanism can be easily incorporated into one chip.

The small size and low mass of the bimorph bending elements for the amount of movement they generate enable the positioning mechanism to have a size and mass comparable with the size and mass of the movable member itself. Consequently, the self-resonant frequency of the positioning mechanism including the bimorph bending elements is comparable with that of the movable member alone. Moreover, in a two-dimensional positioning mechanism, the mass be moved by the y-direction elongate bending element that moves the first frame includes the mass of the actuator that drives the movable member. Since the bimorph bending elements are considerably lower in mass than the stack-type piezoelectric elements of a conventional positioning mechanism, the mass moved by the y-direction elongate bending element is little more than the combined masses of the moving member and the first frame. Consequently, the difference in the self-resonance frequencies in the two dimensions is considerably smaller than in a conventional positioning mechanism. This enables the two-dimensional positioning mechanism to operate at comparable speeds in both dimensions.

The positioning mechanism according to the invention can form part of a one- or two-dimensional positioning device. The positioning device additionally includes a position sensor and a position controller. The position sensor determines the position of the movable member in each dimension and generates a position-indicating signal for the dimension. The position controller receives position control data that specifies the position to which the movable member is to be moved. The position controller also receives the position-indicating signal for each dimension from the position sensor. In response to the position control data and the position-indicating signal, the position controller feeds the driving signal to the elongate bending element for each dimension to cause the elongate bending element to move the movable member to the position specified by the position control data.

When the movable member is supported in the frame by suspension springs, signal tracks can be formed on the surfaces of the suspension springs. The signal tracks conduct the position-indicating signals, or signals from which the position-indicating signals are derived, from position-detecting elements located on the movable member to the position controller located on the frame.

In the positioning devices described above, the position sensor may determine the position of the movable member from the capacitance between capacitor electrodes located on the major surface of the movable member and capacitor electrodes located on a surface facing the major surface of the movable member. The position controller includes a digital-to-analog (D/A) converter, an error amplifier and a drive amplifier, and generates a driving signal for each dimension of the positioning mechanism. The D/A converter receives the position control data that specify the desired position of the movable member and generates a position control signal from such data. The error amplifier generates a signal representing the difference between the position control signal output of the D/A converter and the position-indicating signal generated by the position sensor. The drive amplifier amplifies the output of the error amplifier to generate the voltage that drives the elongate bending element that moves the movable member in the specified direction. The position controller operates so that the elongate bending element is driven to move the movable member to a position at which the two inputs of the error amplifier are equal.

A one- or two-dimensional positioning device similar to that described above can form part of a moving medium-type memory device. When the positioning device forms part of a moving medium-type memory device, the movable member is a stage having a major surface on which a memory medium is located. The memory medium may be a thin film of a ferroelectric material, for example. The major surface is disposed parallel to the direction or directions of movement. The memory device also includes one or more probes disposed so that a probe tip located on the end of each probe contacts the surface of the memory medium, or so the probe tip is separated from the memory medium by a gap of less than about 100 nm. The memory device also includes a read/write circuit for reading and writing data in the memory medium using the probe tips. An electrical connection, such as a ground connection, can be made to the memory medium by a track formed on the surface of one or more of the suspension springs.

When the positioning mechanism according to the invention forms part of a moving medium-type memory device, and the stage and the suspension springs of the positioning mechanism are fabricated as an integral unit from a single substrate of silicon or a similar material, the positions of the bits recorded in the memory medium can be prevented from changing due to thermal expansion by matching the thermal expansion of the stage to the thermal expansion on the substrate in which the probes are fabricated. This enables the moving medium-type memory device to have a high bit density.

In an alternative embodiment of a memory device incorporating the positioning mechanism according to the invention, the probes may be mounted on the movable member of the positioning mechanism to provide a memory device in which the probes move.

An illustrative embodiment 100 of a positioning mechanism according to the invention will now be described in detail with reference to FIG. 2. In the example to be described, the movable member is the stage of a moving medium-type memory device, piezoelectric bimorph bending elements are used as the elongate bending elements, and the positioning mechanism positions the stage in two dimensions, the x-direction and the y-direction. In the positioning mechanism 100, the rectangular stage 101 is surrounded by the inner frame 103. In the example shown, the inner frame is U-shaped and surrounds the stage on three sides. The inner frame may alternatively surround the stage on all four sides. The inner frame is surrounded by the outer frame 105.

The elongate inner bimorph bending element 123 extends across the open side of the inner frame 103. The inner bimorph bending element is oriented in the y-direction, substantially parallel to the side 124 of the stage 101, which enables its length to be accommodated within the length of the side 124. The inner flexible beam 125 couples the center of the inner bimorph bending element to the center of the side 124 of the stage. The inner bimorph bending element moves the stage in the x-direction, i.e., perpendicular to its length orientation.

The elongate outer bimorph bending element 127 is located in the recess 129 formed in the outer frame 105. The outer bimorph bending element is oriented in the x-direction, substantially parallel to the side 128 of the stage 101, which enables its length to be accommodated substantially within the length of the side 128. The side 128 is perpendicular to the side 124 along which the inner bimorph bending element is aligned. The outer flexible beam 131 couples the center of the outer bimorph bending element to the center of the side of the inner frame that is next to the side 128 of the stage. The outer bimorph bending element moves the inner frame and the stage in the y-direction, i.e., perpendicular to its length orientation.

The stage 101 is supported in the inner frame 103 by the inner suspension springs 115. The suspension springs allow the stage to move easily relative to the inner frame in the x-direction, but resist movement in the y- and z-directions. The inner suspension springs are located at the four corners of the stage and extend between the stage and the inner frame.

The inner frame is supported in the outer frame 105 by the outer suspension springs 119. The outer springs allow the inner frame together with the stage to move easily relative to the outer frame in the y-direction, but resist movement in the x- and z-directions. The outer suspension springs are located at the four corners of the inner frame and extend between the inner frame and the outer frame.

Figure 2:
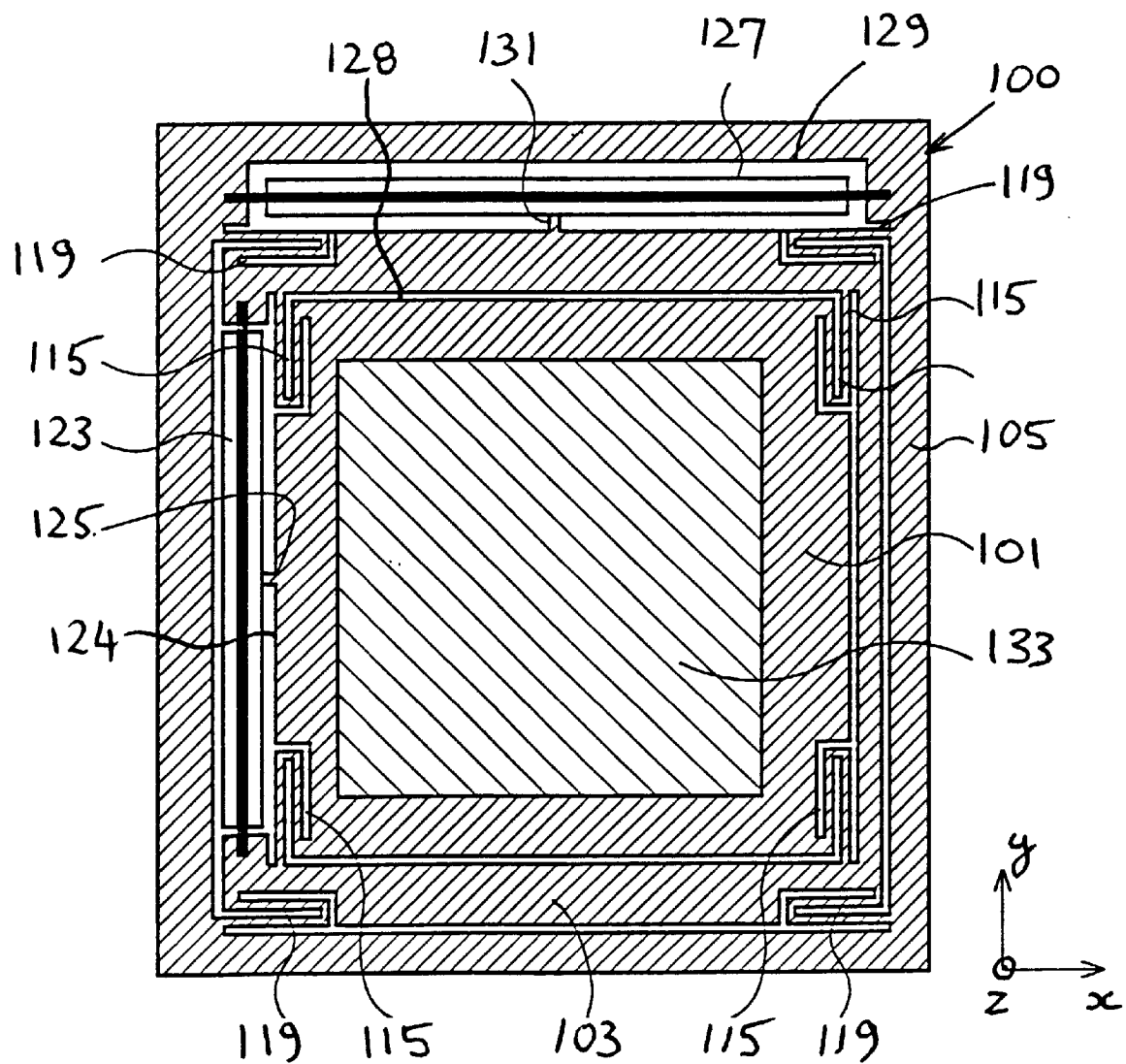
FIG. 2 shows an embodiment of a positioning mechanism according to the invention.

When the positioning mechanism shown in FIG. 2 is used in a moving medium-type memory device, the memory medium 133 is formed on part of the major surface of the stage 101.

The stage 101, the inner frame 103, the outer frame 105, the flexible beams 125 and 131 and the suspension springs 115 and 119 are all formed as an integral unit from a single silicon substrate using micro-machining techniques. The silicon of the substrate is preferably single-crystal silicon. Single-crystal silicon is preferred because the variation in the compliance of suspension springs formed from single-crystal silicon is small compared to that of metal springs. Furthermore, the durability of such springs is high, so that there is little change in the compliance even after the springs have been deflected an extremely large number of times. Thus, forming the suspension springs from single-crystal silicon provides ideal mechanical characteristics and a long useful life.

The bimorph bending elements 123 and 127 are each composed of a layer of a piezoelectric material located on the opposite major surfaces of a long, thin metal plate called a shim. A thin piece of single-crystal silicon that has been doped to make it conductive could alternatively be used as the shim. The layers of piezoelectric material are shorter than the shim so that the end portions of the shim are exposed. The layers of piezoelectric material have different directions of polarization relative to the shim. The structure of the bimorph bending elements will be described in more detail below with reference to FIGS. 4 and 5.

The bimorph bending element 123 is inserted into the recess provided by the open side of the inner frame 103 and the exposed ends of the shim are attached to the inner frame. The bimorph bending element 127 is inserted into the recess 129 in the outer frame 105 and the exposed ends of the shim are attached to the outer frame. Also, the center portions of the bimorph bending elements are respectively coupled to the stage and inner frame by the flexible beams 125 and 131.

An electric potential applied across the layers of the piezoelectric material of the bimorph bending elements 123 and 127 causes each bimorph bending element to bend in the direction perpendicular to the major surface of its shim. When the shims are mounted as described, this bending is parallel to the surface of the stage 101. The maximum lateral displacement resulting from the bimorph bending elements bending occurs at the centers of the bimorph bending elements. Coupling the centers of the bimorph bending elements to the centers of the stage 101 and the inner frame 103 by the flexible beams 125 and 131 enables the bimorph bending element 123 to move the stage in the x-direction and enables the bimorph bending element 127 to move the inner frame and the stage in the y-direction.

Both ends of each of the shims constituting the bimorph bending elements 123 and 127 may be attached to the inner frame 103 and the outer frame, respectively, and the center portions of the bimorph bending elements may be coupled to the stage 101 and the inner frame, respectively, by an epoxy-type adhesive, as will be described in more detail below with reference to FIG. 7. However, this way of attaching and coupling the bimorph bending elements is not essential in the invention, and the bimorph bending elements may be attached and coupled in other ways.

Ideally, the bimorph bending elements 123 and 127 move the members to which they are attached simply by bending in the direction perpendicular to the major surfaces of their respective shims, and there is no angular movement of the centers of the bimorph bending elements as a result of the bimorph bending elements bending. In other words, there is no lengthways twisting of the bimorph bending elements as a result of the bimorph bending elements bending. However, a slight angular movement of the centers of practical bimorph bending elements may occur as a result of the bimorph bending element bending. Causes of this include non-uniformity in the piezoelectric material and differences in the rigidity of the attachments at the ends of the shims. Consequently, the center portions of the bimorph bending elements 123 and 127 are coupled to the stage 101 and the inner frame 103 by the flexible beams 125 and 131. The flexible beams isolate the stage and the inner frame from any rotational movement of the centers of the bimorph bending elements. The flexible beams will be described in more detail below with reference to FIG. 7.

Figure 3:
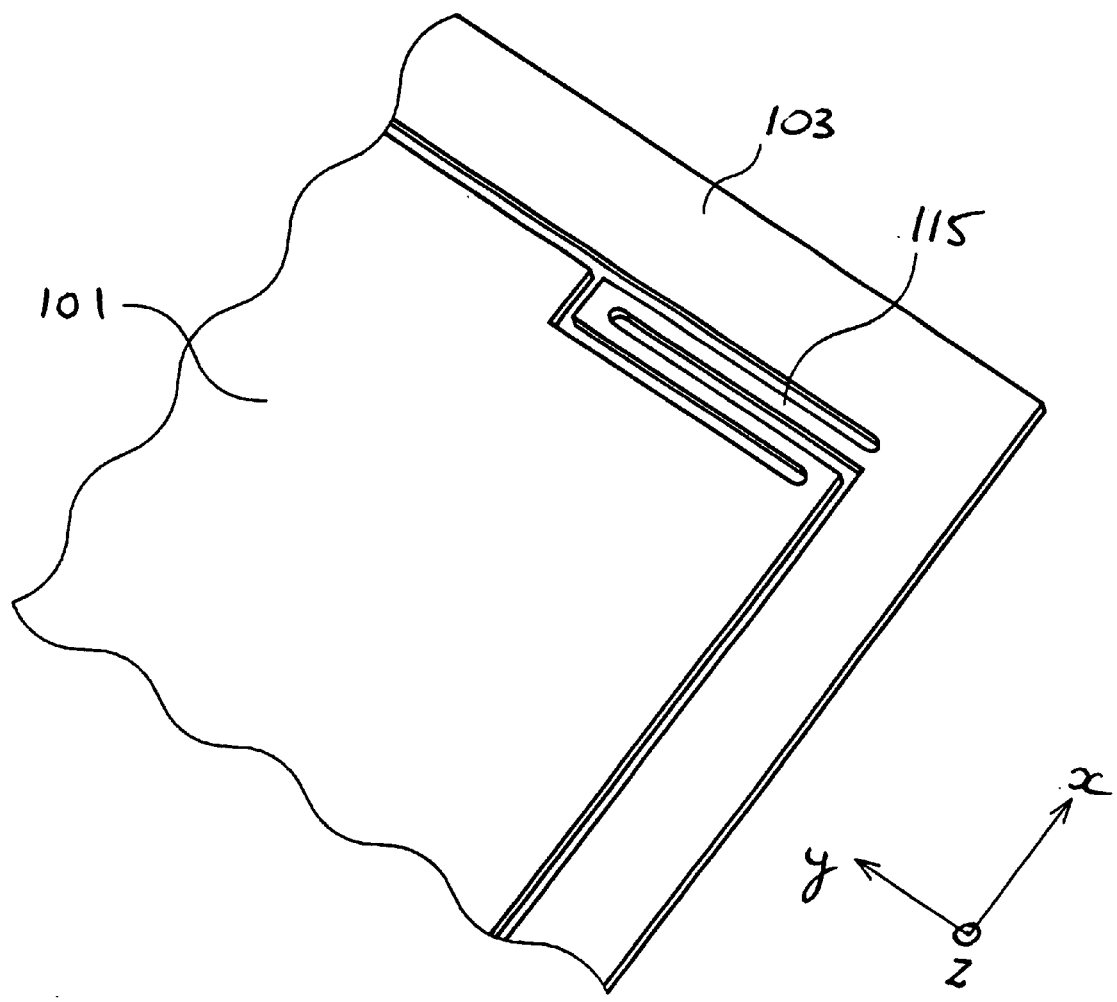
FIG. 3 shows the suspension springs of the embodiment shown in FIG. 2.

FIG. 3 shows in detail the suspension spring 115 as an example of the suspension springs 115 and 119 shown in FIG. 2. The inner suspension springs 115 are highly compliant in the x-direction, but resist movement of the stage 101 in the y- and z-directions. The suspension springs 119 are highly compliant in the y-direction but resist movement of the inner frame 103 in the x- and z-directions. In the example shown in FIG. 2, four inner suspension springs 115 and four outer suspension springs 119 are used. However, more suspension springs may be used.

When a bimorph bending element is operated without a load, the unloaded lateral movement of a bimorph bending element in response to a given driving voltage depends on the compliance of the bimorph bending element in the direction of movement. When the stage 101 suspended by the inner suspension springs 115 is attached to the bimorph bending element 123, the inner suspension springs resist movement of the central portion of the bimorph bending element. This reduces the lateral movement of the bimorph bending element. The collective compliance of the inner suspension springs determines the fraction of the unloaded lateral movement of the bimorph bending element that is translated into the lateral movement of the stage. For example, if the collective compliance of the inner suspension springs is equal to the compliance of the bimorph bending element, the lateral movement of the stage in response to a given driving voltage will be equal to one-half of the unloaded lateral movement of the portion of the bimorph bending element to which the stage is attached. The collective compliance of the suspension springs 115 is set so that as much as possible of the unloaded lateral movement of the bimorph bending element 123 is translated into lateral movement the stage 101. Also, the collective compliance of the outer suspension springs 119 is set so that as much as possible of the unloaded lateral movement of the bimorph bending element 127 is translated into lateral movement the first frame 103.

The inner suspension springs 115 must prevent the stage 101 from moving in the y-direction relative to the inner frame 103 when the outer bimorph bending element 127 moves the inner frame in the y-direction. Also, the outer suspension springs 119 must prevent the inner frame from moving in the x-direction relative to the outer frame 105 when the inner bimorph bending element 123 moves the stage in the x-direction. Accordingly, the compliance of inner suspension springs 115 must be low in both the y-direction and the z-direction, and the compliance of the outer suspension springs 119 must be low in both the x-direction and the z-direction. These characteristics are obtained by forming the suspension springs 115 and 119 with a cross-sectional shape in which the springs are much narrower in the intended direction of movement than their thickness in the z-direction, so that the suspension springs have a high aspect ratio. Moreover, the suspension springs are formed to have a long spring length.

The suspension springs 115 and 119 may be I-shaped single beams. However, to increase the overall length of the suspension springs that can be accommodated within the dimensions of the stage 101 or the inner frame 103, the suspension springs are preferable folded into the "U" shape shown in FIGS. 2 and 3. Other folded shapes, such as a V-shape, or a double-folded W-shape, may alternatively be used. Other spring shapes are may be used, but they should not translate movement in the intended direction of movement into additional movement in other directions.

The suspension springs 115 and 119 may be formed with the characteristics just described using silicon micro-machining. Such silicon micro-machining techniques include high-speed reactive ion etching, in which the silicon is etched using reactive ions of a fluorine-type gas such as carbon tetraflouride ($CF_4$) or $CF_2Cl_2$. The portions of the substrate that are not to be etched are protected using a mask of silicon dioxide ($SiO_2$) or another suitable material. Furthermore, maskless electro-discharge machining may be used. In this, the silicon is etched by an electrostatic discharge between the silicon and a fine electrode positioned a few microns away from it by a micro-actuator. Any of the above-described etching methods may be used to remove parts of the substrate to define the shapes of the stage 101, the inner frame 103, the outer frame 105.

The substrate material of the positioning mechanism according to the invention is not limited to silicon. For example, semiconductor materials such as silicon dioxide ($SiO_2$), sapphire, lithium niobate ($LiNbO_3$) or gallium arsenide (GaAs), metals such as stainless steel, and various other materials such as ceramics may alternatively be used.

Figure 4:
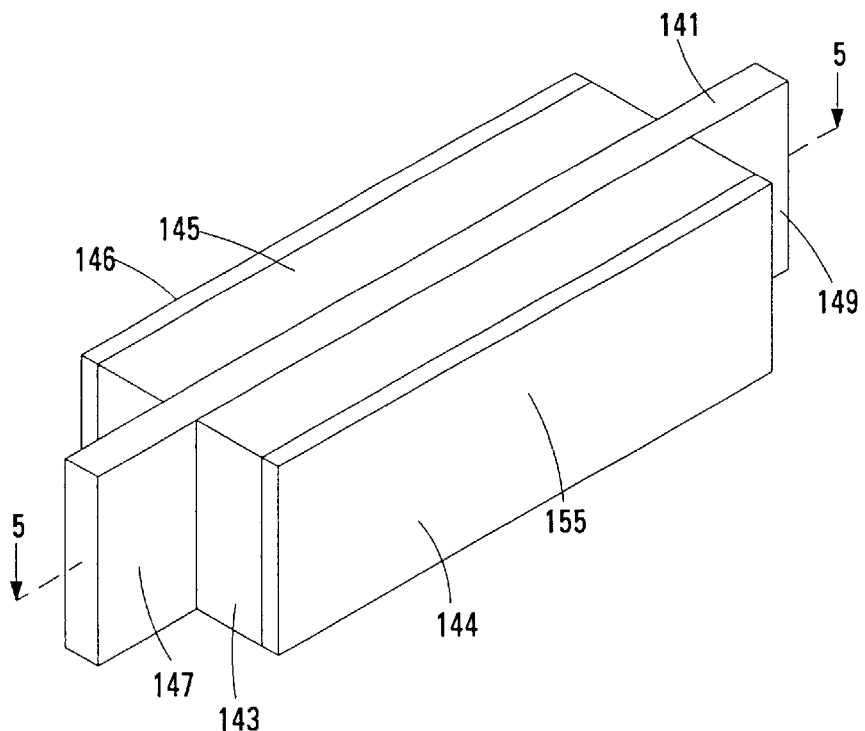
FIG. 4 is a perspective view of a bimorph bending element.
Figure 5:
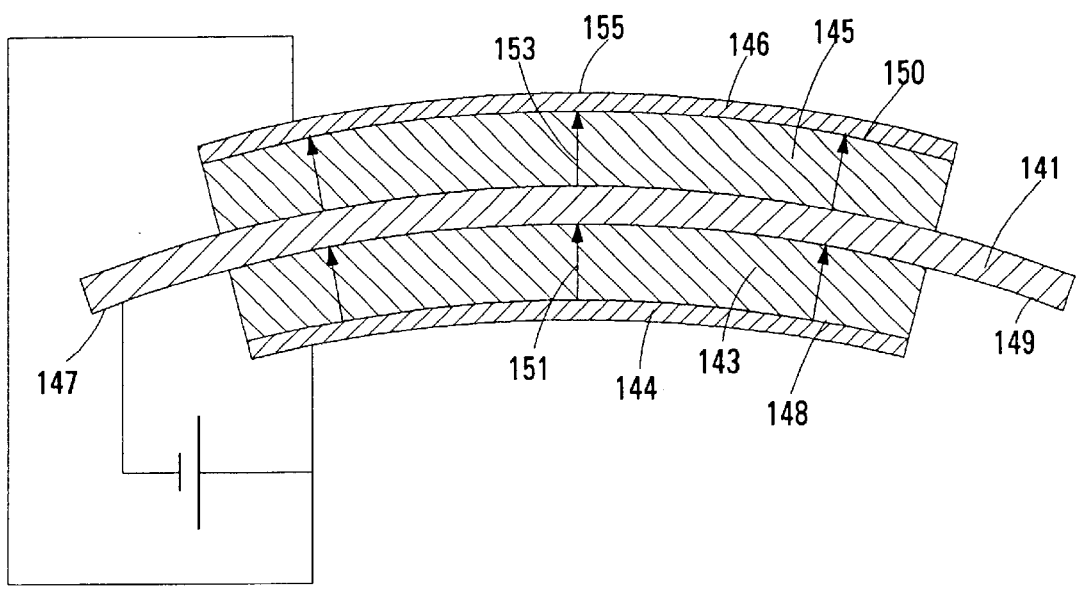
FIG. 5 is a cross-sectional view in the plane indicated by the line 5—5 in FIG. 4 showing how a bimorph bending element bends in response to an applied driving voltage.

Next, the inner bimorph bending element 123 will be described in detail with reference to FIGS. 4 and 5. The outer bimorph bending element 127 is similar so will not be described. In the bimorph bending element 123, the shim 141 is sandwiched between the layers 143 and 145 of piezoelectric material. The layers of piezoelectric material will be referred to as piezoelectric layers. The shim is a thin, elongate plate of a suitable metal, such as stainless steel, or conductive single-crystal silicon. The piezoelectric layers are also elongate and thin, and are bonded to the shim in the preferred embodiment. The thickness of the piezoelectric layers, i.e., their dimension in the z-direction, is the same as that of the shim, but the piezoelectric layers are shorter than the shim so that the end portions 147 and 149 of the shim project lengthways from the piezoelectric layers. The electrodes 144 and 146 are located on the surfaces 148 and 150 of the piezoelectric layers 143 and 145, respectively. The surfaces 148 and 150 are opposite the surfaces of the piezoelectric layers 143 and 145, respectively, that contact the shim 141.

Relative to the shim 141, the directions of polarization of the piezoelectric layers 143 and 145 face in opposite directions, as indicated by the arrows 151 and 153. As a result, a positive voltage applied between the shim and the electrodes 144 and 146 on the surfaces of the piezoelectric layers 143 and 145, as shown in FIG. 5, establishes a voltage gradient across the piezoelectric layer 143 that is opposite in direction to the direction of polarization 151, and establishes a voltage gradient across the piezoelectric layer 145 that is the same in direction as the direction of polarization 153. This causes the piezoelectric layer 143 to contract, and the piezoelectric layer 145 to expand. This causes the bimorph bending element 123 to bend so that its central portion 155 is laterally displaced relative to both of its end portions 147 and 149 in the direction perpendicular to the major surfaces of the shim. Similarly, if the voltage applied between the shim 141 and the electrodes 144 and 146 is of the opposite polarity to that shown in FIG. 5, the bimorph bending element 123 will bend in the direction opposite to that shown.

The lateral displacement of the central portion 155 relative to the end portions 147 and 149 is large in relation to the dimensions of the bimorph bending element, and is considerably larger than lengthways displacement generated by a stack-type piezoelectric element of the same length. For example, a bimorph bending element in which the piezoelectric layers have a length (in the y-direction shown in FIG. 2) of 10 mm, a width (in the x-direction) of approximately 0.3 mm and a thickness (in the z-direction) of 1 mm will generate a lateral displacement of approximately ±50 µm and a driving force of approximately 30 mN in response to a driving voltage of approximately ±50 V.

In alternative embodiments of the positioning mechanism according to the invention, other elongate bending elements may be substituted for the bimorph bending elements 123 and 127. In positioning mechanisms for use in applications in which the stage 101 does not have to be moved rapidly, thermally-actuated bending elements that bend in response to a mechanical shape deformation caused by a temperature change may be used. Elements that bend in response to a shape deformation caused by a temperature change include bimetallic elements formed by bonding different metals together, or shape memory alloys, for example. In embodiments incorporating such thermally-actuated bending elements, the amount of movement of the stage 101 can be controlled by bonding an electrical heating device, such as a resistor, to the element to vary the temperature of the element. A Peltier element may be used instead of the resistor so that heating or cooling can be effected.

Figure 6:
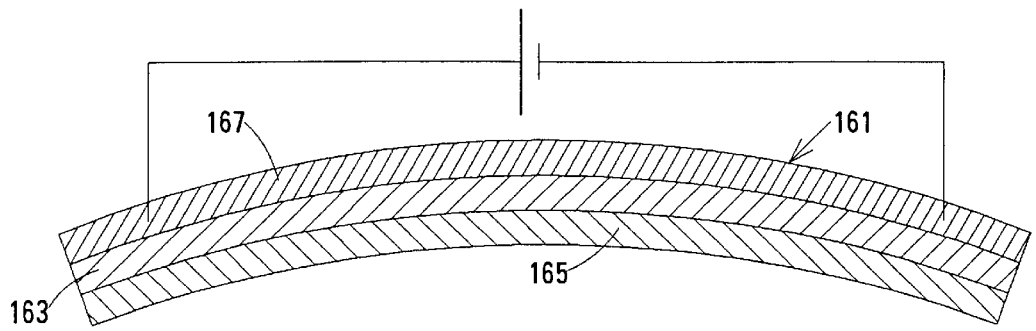
FIG. 6 shows an alternative embodiment of the elongate bending element based on a bimetallic element combined with a heat-generating element.

FIG. 6 shows an example of an elongate bending element 161 composed of an elongate bimetallic element attached to an electrical heater. The bimetallic element is formed by bonding the thin, elongate layers 163 and 165 to one another. The materials of these layers have different thermal expansion coefficients. The resistor 167 is bonded to the layer 163, remote from the layer 165. The amount of heat applied to the bimetallic element, and, hence the temperature of the bimetallic element, is varied by varying the voltage applied to, or the current passed through, the resistor 167. This enables the stage 101 to be moved in the same manner as when the stage is moved by applying a voltage to the bimorph bending elements 123 and 127.

Figure 7:
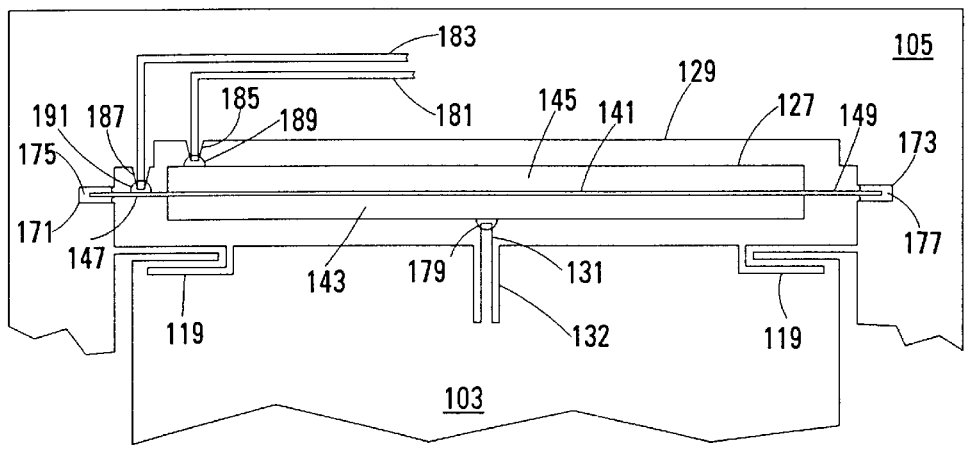
FIG. 7 shows a way of mounting a bimorph bending element in the outer frame and of making electrical connections to the bimorph bending element.

FIG. 7 shows an example of the ways in which the outer bimorph bending element 127 is mounted in the outer frame 105, the central portion of the bimorph bending element is coupled to the inner frame 103 by the outer flexible beam 131, and the driving voltage is connected to the bimorph bending element. The inner bimorph bending element 123 is mounted in the inner frame 103, is coupled to the stage 101 by the inner flexible beam 125, and the driving voltage is connected to it in a similar way and so will not be described. FIG. 7 shows the slots 171 and 173 formed in the end walls of the recess 129. The slots 171 and 173 are dimensioned to receive the end portions 147 and 149 of the shim 141 that forms part of the bimorph bending element 127. The slots help define the location of the bimorph bending element in the outer frame, and so speed up the production process of installing the bimorph bending element in the outer frame.

The slots 171 and 173 are preferably formed in the course of defining the shapes of the stage, the inner frame, the outer frame and the suspension springs by etching a single substrate. For example, the mask that defines the areas of the substrate removed to define the above element can also define the areas of the substrate that are removed to define the slots.

The end portions 147 and 149 of the shim 141 that forms part of the bimorph bending element 127 are held in place in the slots 171 and 173 by a suitable adhesive, shown at 175 and 177, placed in the slots. For example, a UV-cured resin may be used as the adhesive.

In the embodiment shown in FIG. 7, the bimorph bending element 127 is coupled to the inner frame 103 by the flexible beam 131 and the adhesive fillet 179. In embodiments in which the inner frame is clamped between a complementary pair of bimorph bending elements, the adhesive fillet may be omitted. The flexible beam is preferably formed integrally with the inner frame 103 in the course of defining the shapes of the stage, the inner frame, the outer frame and the suspension springs by etching a single substrate. For example, the mask that defines the areas of the substrate removed to define the above elements can also define the areas of the substrate that are removed to define the flexible beam.

The flexible beam 131, which transmits the displacement in the y-direction of the center of the bimorph bending element 127 to the inner frame 103, is preferably structured as an elongate, thin beam. This shape provides it with a substantially lower compliance in the y-direction than in the other two directions. The compliance of the flexible beam 131 in the y-direction should be low compared with the compliance of the outer suspension springs 119 in the y-direction. This characteristic enables the flexible beam to effectively couple the displacement of the bimorph bending element to the inner frame. The compliance of the flexible beam in the x- and z-directions, on the other hand, should be substantially greater than the compliance of the suspension springs 119 in these directions. This characteristic enables the flexible beam to absorb any rotational movement of the bimorph bending element and therefore prevent such rotational movement from being coupled to the inner frame.

To accommodate the elongate shape of the flexible beam 131 within the overall dimensions of the outer frame 105, the above-mentioned process of forming the flexible beam may additionally define the recess 132 in the inner frame 103, and may define the flexible beam to extend from the bottom of recess, as shown in FIG. 7. The preferred structure and characteristics of the flexible beam 125 are similar to those just described, and so will not be described separately.

The end of the flexible beam 131 remote from the inner frame 103 is positively attached to the center portion 155 of the bimorph bending element 127 by the adhesive fillet 179. The positive attachment between the bimorph bending element and the flexible beam enables the bimorph bending element to move the inner frame 103 in the +y-direction as well as in the −y-direction. The adhesive fillet is a blob of a suitable adhesive that surrounds the end of the flexible beam adjacent the bimorph bending element. A UV-cured resin, for example, may be used as the adhesive.

FIG. 7 also shows an example of the way in which the electrical connections for the driving voltage are made to the bimorph bending element 127. The driving voltage is generated by a position controller shown in FIG. 11, and is fed from the position controller by the conductive tracks 181 and 183. The conductive tracks are formed on the surface of the outer frame 105 by a conventional metallization process before or after the stage, inner frame, outer frame and suspension springs have been defined in the substrate as an integral unit. The tracks terminate at the ends of the protuberances 185 and 187, respectively. The protuberances project from the recess 129 towards the bimorph bending element 127. The protuberances 185 and 187 are respectively located adjacent the end portion 147 of bimorph bending element 127 where the shim 141 is exposed, and part of the piezoelectric element 145 near the end portion 147. These parts of the bimorph bending element are subject to the least amount of lateral displacement when the bimorph bending element bends. The ends of the protuberances are separated from the respective parts of the bimorph bending element by a small gap to accommodate the lateral displacement that results from the bending of the bimorph bending element.

The conductive adhesive fillets 189 and 191 respectively connect the protuberances 185 and 187 to the piezoelectric element 145 and the shim 141 of the bimorph bending element 127. The adhesive fillets are blobs of a suitable conductive adhesive that respectively surround the ends of the protuberances and extend to the piezoelectric element and the shim. For example, a UV-cured conductive resin may be used as the conductive adhesive. An electrical connection (not shown) local to the bimorph bending element couples the driving voltage from the electrode 146 on the piezoelectric element 145 to the electrode 144 on the piezoelectric element 143.

The positioning mechanism described above may form part of a positioning device that additionally includes a position sensor and a position controller that will be described below with reference to FIG. 11. Such a positioning device can be used for positioning the memory medium relative to the probes in a moving medium-type memory device. See, for example, published International Application No. WO95/12932, assigned to the assignee of this application.

One exemplary embodiment of a moving medium-type memory device incorporating the positioning mechanism according to the invention will be described next with reference to FIGS. 8 through 10. The position controller used in the positioning device of the moving medium-type memory device will be described in detail below with reference to FIG. 11.

Figure 8:
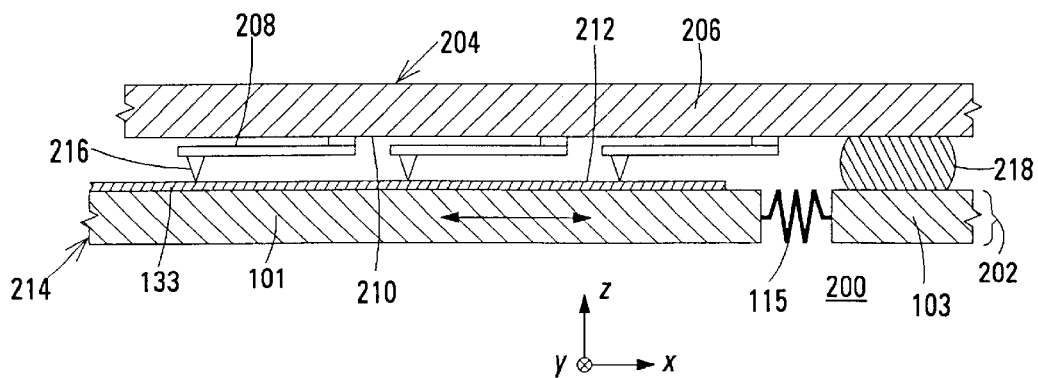
FIG. 8 shows a moving medium-type memory device incorporating the positioning mechanism according to the invention.

FIG. 8 is a partial cross-sectional view of an example of the moving medium-type memory device 200 composed of the memory medium device 202 and the probe device 204. The example shown in FIG. 8 is simplified in that the positioning mechanism 100 that forms part of memory medium device moves the stage 101 in the x-direction only, and the outer frame 105 shown in FIG. 1 is omitted. The memory medium device 202 is disposed opposite the probe device 204 by attaching the inner frame 103 of the positioning mechanism to the probe device using a number of solder bumps, for example. An exemplary solder bump is shown in FIG. 8 at 218. The solder bumps will be described in more detail below. The memory medium 133 is located on the major surface of the stage 101. The memory medium device 202, including the positioning mechanism 100, is formed as an integral unit in the memory substrate 214.

The probe device 204 includes the probe substrate 206 and the probes 208. The probes are formed on or in the surface 210 of the probe substrate. An electrically-conductive probe tip 216 is located on the end of each probe remote from the attachment point between the probe and the probe substrate. When the positioning device 100 moves the stage relative to the probe device 204, the electrically-conductive tip on the end of each probe moves along the surface 212 of the memory medium 133 to write data into or read data from the memory medium. In the simplified example shown in FIG. 8, the memory medium is shown as moving only in the x-direction. In a practical memory device, the memory medium moves in both the x-direction and the y-direction so that each probe writes and reads bits in a two-dimensional array on the surface of the memory medium.

Various types of materials that are capable of recording data may be used as the memory medium 133. For example, ferroelectric materials, ferromagnetic materials, functional organic thin films or the like may be used as the memory medium.

The solder bumps 218 are drum-shaped conductive metal columns formed from solder or a similar material that define the relative positioning of the probe device 204 and the memory medium device 202 in the plane of the surface 212 of the memory medium and define the narrow gap that separates the surface 210 of the probe substrate from the surface 212 of the memory medium. The gap defines the range of movement of the probes 208 between the probe device and the memory medium device. The solder bumps also provide mechanical and electrical connections between the probe substrate 206 and the memory substrate 214 in which the positioning mechanism 100 is fabricated.

Because the regions of the memory medium 133 in which the bits of data are stored are so small, with a typical diameter of about 30 nm, thermal expansion of the stage 101 causes shifts in the positions of the bits that can be large compared with the size of the bits. The thermal expansion coefficient of silicon is approximately 2.33 ppm/°C. Accordingly, the thermal expansion that results from changing the temperature of a 10 mm-square silicon stage by 40° C. is approximately 930 nm, equivalent to about 30 bits. However, the effects of thermal expansion can be reduced by using the same material, preferably single-crystal silicon, for both the memory substrate 214 and the probe substrate 206. This matches the thermal expansion coefficients of the probe substrate and the memory substrate.

The effect of thermal expansion on the positions of the bits can be further reduced by restricting the temperature difference between the probe substrate 206 and the memory substrate 214 to less than 1° C. The temperature difference is reduced to this order by making the gap between the substrates less than about 2 $\mu$m, and by preferably filling the gap with a gas such as air or, more preferably, helium. This reduces the shift in the positions of the bits caused by differences in thermal expansion to less than a few nm. Such a small shift in the positions of the bits enables the size of the bits to be minimized, which maximizes the density of the bits. Accordingly, from the standpoint of maximizing the density at which bits can be stored in the memory medium, the positioning mechanism shown in FIG. 2, which has a stage 101 on which a high-density memory medium 133 is formed, is especially suitable for use in a moving medium-type memory device.

The positioning mechanism according to the invention allows a gap of less than 2 $\mu$m to be sustained between the memory substrate 214 and the probe substrate 206 because the positions of the stage 101 and the inner frame 103 in the z-direction are constant and repeatable. The positions of the stage and the inner frame are constant and repeatable because (a) the compact size and light weight of the bimorph bending element 123 allows the inner frame to be made small and light so that the deflection of the suspension springs 119 in the z-direction depends negligibly on the spatial orientation of the positioning device, and (b) the bimorph bending elements generate negligible forces in the z-direction.

Figure 9A:
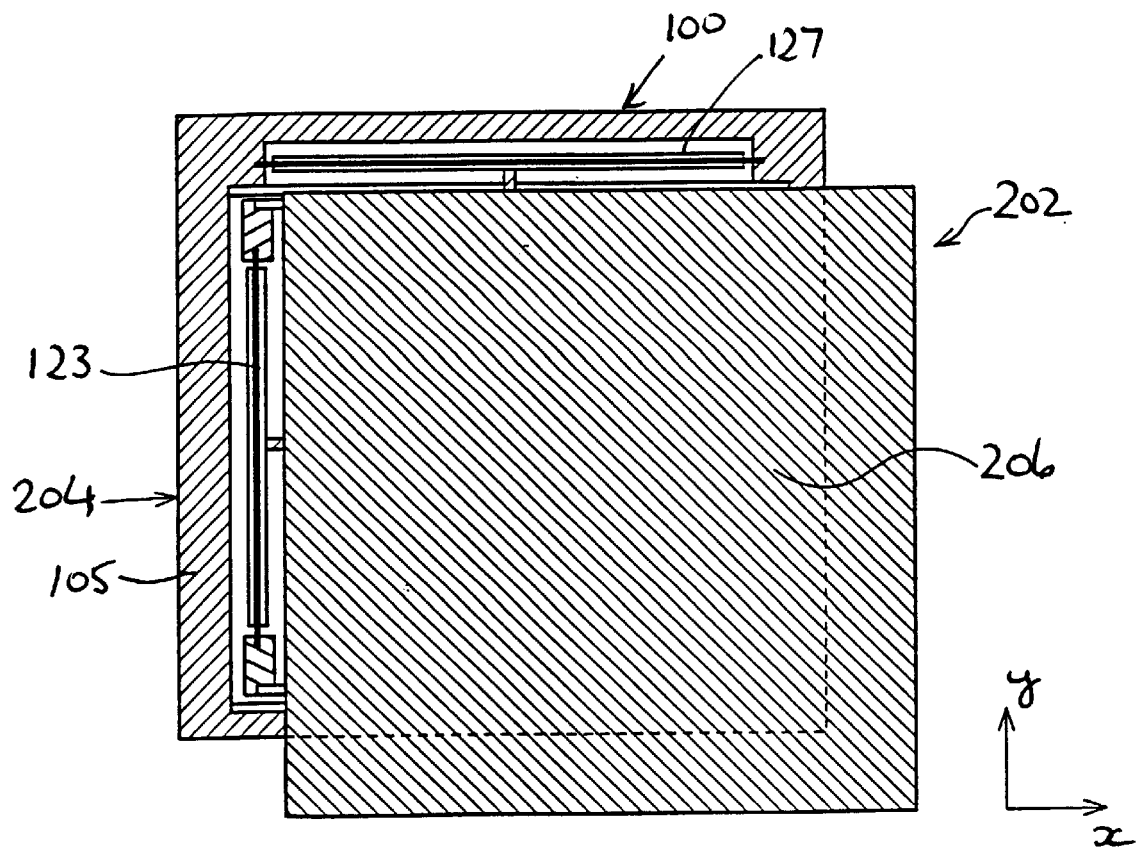
FIGS. 9A and 9B are respectively a top view and a side view showing the positional relationship between the stage substrate and probe substrate in an embodiment of the moving medium-type memory device shown in FIG. 8 in which the probe substrate is mounted in an offset position relative to the stage substrate.
Figure 9B:
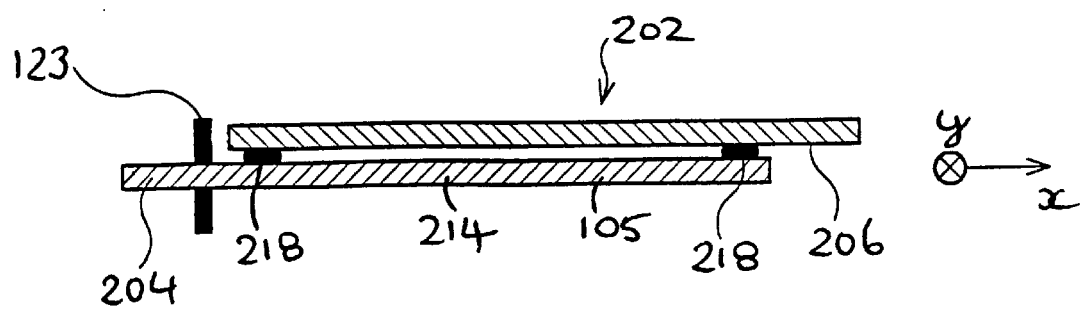

FIGS. 9A and 9B are respectively a top view and a side view of an embodiment of the moving medium-type memory device 200 shown in FIG. 8 in which the bimorph bending elements 123 and 127 have a thickness (i.e., a dimension in the z-direction) that is greater than the thickness of the memory substrate 214 from which the stage and the inner frame (not shown) and the outer frame 105 constituting the positioning mechanism 100 are fabricated. To accommodate such thick bimorph bending elements, the probe substrate 206 is laterally offset from the memory substrate so that the probe substrate does not extend outside the area bounded by the bimorph bending elements. Alternatively, the probe substrate can be mounted so that it completely overlaps the memory substrate if the bimorph bending elements have a thickness that is about the same as the thickness of the memory substrate 214.

In the conventional moving medium-type memory device shown in FIG. 1 that uses a conventional positioning mechanism, the stack-type piezoelectric elements 7 through 13 are long and thick, and must be located on all four sides of the positioning mechanism. This prevents an overlapping arrangement similar to that shown in FIGS. 9A and 9B from being adopted in such conventional memory devices, and increases the size of the memory devices. Thus, the positioning mechanism shown in FIG. 2, in which a high-density memory medium 133 is located on the stage 101 additionally has the advantage of providing compactness when used in a moving medium-type memory device.

In a moving medium-type memory device, the probe tips on the ends of the probes must be aligned extremely precisely with the regions of the memory medium in which the bits are stored. Precision in the order of a few nanometers is required. To achieve the required precision, the bimorph bending elements 123 and 127 must be driven by a servo-type position controller that uses a position sensor to determine the actual position of the stage 101 and that controls the voltage applied to the bimorph bending elements in response to the position of the stage.

Figure 10:
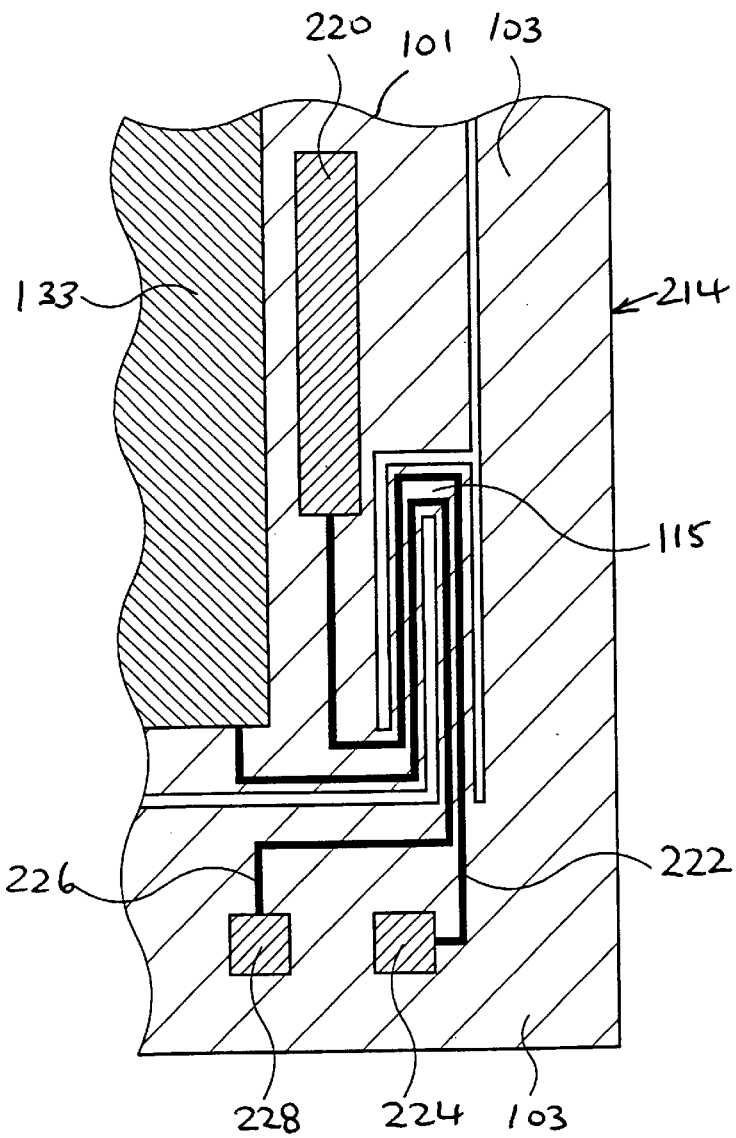
FIG. 10 shows how conductive tracks may be routed across the surface of a suspension spring.

FIG. 10 shows an example of part of a moving medium-type memory device that includes a positioning mechanism according to the invention and that can be controlled by a servo-type position controller. The servo-type position controller requires that a signal indicating the position of the stage 101 in the x-direction be fed from the stage to a position sensor circuit located on the frame or the probe substrate (not shown). This signal is fed to the position sensor circuit by conductive tracks formed on the surface of the suspension springs that support the stage in the inner frame.

The example shown in FIG. 10 is again simplified in that the positioning mechanism 100 moves the stage 101 in the x-direction only, and the outer frame is omitted. Consequently, the inner frame 103 is directly attached to the probe device (not shown) instead of via the outer frame.

In the example shown in FIG. 10, the elongate capacitor electrode 220 is located on part of the surface of the memory substrate 214. The capacitor electrode 220, together with a similar-shaped additional capacitor electrode (not shown), form part of a position sensor that detects the position of the stage in the x-direction. The additional capacitor electrode is located opposite the capacitor electrode 220 on part of the major surface of the probe substrate (206 shown in FIG. 8) that faces the part of the surface of the memory substrate 214 on which the capacitor electrode 220 is located. The capacitor electrode 220 and the additional capacitor electrode are separated by a narrow gap and collectively form a parallel-plate capacitor. Movement of the stage in the x-direction causes the overlap between the capacitor electrodes to change, which changes the capacitance of the parallel-plate capacitor to change. A position sensor circuit connected to the parallel-plate capacitor generates the position-indicating signal that indicates the position of the stage in the x-direction.

A capacitance-based position sensor in which four parallel-plate capacitors similar to the parallel-plate capacitor just described are interconnected to form a bridge circuit is described in European patent application no. 97305425.7, assigned to the assignee of this application. Such position sensor is compact, has a high sensitivity, and can be fabricated integrally with the positioning mechanism without additional processing. In a positioning mechanism that moves the stage in both the x- and y-directions, a second position sensor having capacitor electrodes that are elongate in the x-direction is also located on the stage 101 to detect the position of the stage in the y-direction.

The position sensor just described requires that an electrical connection be made between the capacitor electrode 220 mounted on the stage 101 and the position sensor circuit located on the probe substrate, for example. This can be accomplished by forming the track 222 on the surface of the suspension spring 115. The track 222 is electrically connected at one end to the capacitor electrode mounted on the stage 101 at the other end to the pad 224. The track 222 and a solder bump formed on the pad 224 electrically connect the capacitor electrode to the position sensor circuit formed on the probe substrate (not shown). The pads, tracks and electrodes are formed using conventional semiconductor processes preferably performed prior to the silicon micromachining described above.

FIG. 10 also shows the track 226 electrically connected to the memory medium 133 located on the major surface of the stage 101. The track 226 extends across the surface of the inner suspension spring 115 and connects to the pad 228 located on the inner frame 103. The track 226 and a solder bump formed on the pad 228 electrically connect the memory medium to a reading and writing circuit (not shown) located on the probe device (not shown).

In an embodiment of the positioning mechanism that moves the stage in two dimensions, the track 222 also extends across the surface of one of the outer suspension springs 119 (FIG. 2), and the pad 224 is located on the outer frame 105. In such an embodiment, the driving voltage for the inner bimorph bending element 123 can be supplied by tracks extending across the surface of one or more of the outer suspension springs 119.

Figure 11:
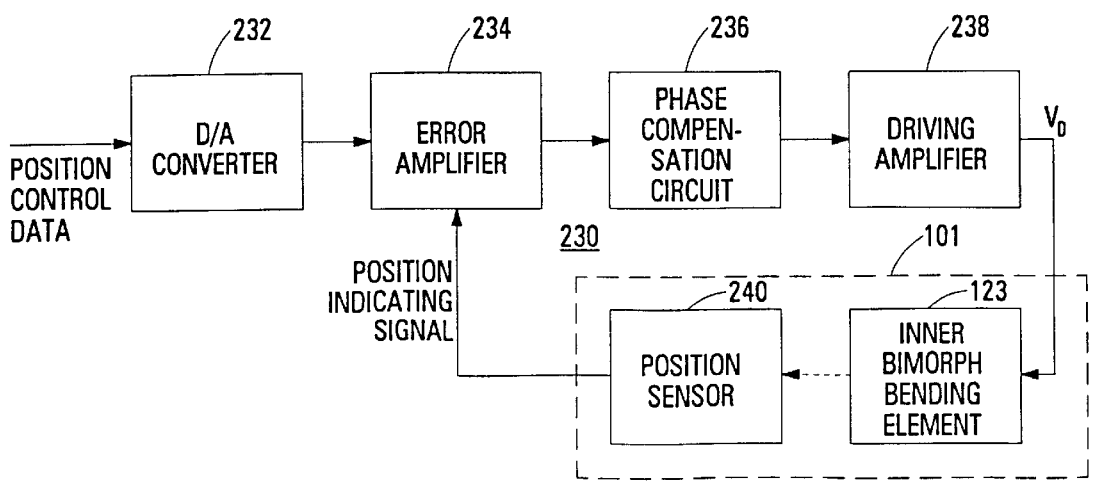
FIG. 11 is a block diagram of a position controller that may be used to control the positioning mechanism according to the invention.

FIG. 11 is a block diagram of an example of a position controller that generates the driving voltage applied to the inner bimorph bending element 123 to control the position in the x-direction of the stage 101 of the moving medium-type memory device shown in FIGS. 8 through 10. A similar position controller is used to generate the driving voltage applied to the outer bimorph bending element 127 to control the position of the stage in y-direction.

The position controller 230 shown in FIG. 11 receives position control data indicating the desired position of the stage 101 in the x-direction, and also receives the position-indicating signal generated by the position sensor 240. The position-indicating signal indicates the actual position of the stage in the x-direction. The position controller generates the driving signal $V_D$ that drives the inner bimorph bending element 123. The position controller is composed of a serial arrangement of the digital-to-analog (D/A) converter 232, the error amplifier 234, the optional phase-compensation circuit 236 and the driving amplifier 238.

The inner bimorph bending element 123 moves the stage 101 in the x-direction to a position that depends on the magnitude of the driving voltage applied to it. The position sensor 240, which may include the capacitor electrode 220 shown in FIG. 10, generates a DC voltage that indicates the actual position of the stage 101 in the x-direction. The D/A converter 232 receives the position control data, and generates from these data a DC voltage corresponding to the desired stage position. The output voltage of the A/D converter is fed to one input of the error amplifier 234. The other input of the error amplifier receives the position-indicating signal from the position sensor 240. The error amplifier generates an output voltage proportional to the difference between the output voltage of the D/A converter 232 and the position-indicating signal generated by the position sensor 240. The error amplifier feeds its output voltage to the driving amplifier 238. The phase-compensation circuit 236 may be included in the path between the output of the error amplifier and the driving amplifier to enhance the stability of the control loop. The driving amplifier generates the driving voltage for the bimorph bending element 123 in response to the phase-compensated output of the error amplifier.

The position controller shown in FIG. 11 enables the positioning mechanism according to the invention to move the stage 101 to the position specified by the position control data. The position controller is a negative feedback-type servo circuit that operates to reduce the difference between the voltages received by the error amplifier 234 to zero. In other words, the position controller generates the driving signal at a level such that the inner bimorph bending element moves stage to a position at which the output voltage of the position sensor 240 is equal to the output voltage of D/A converter 232.

As noted above, the example of the position controller 230 shown in FIG. 11 controls the position of the stage in one direction, i.e., the x-direction in this example. A second position controller may additionally be used to control the position of the stage in the y-direction. Ordinarily, the position controller controls the position of the stage in the moving medium-type memory device shown in FIGS. 8 through 10 in response to the position control data generated by a micro computer or similar device.

Although this disclosure describes illustrative embodiments of the invention in detail, it is to be understood that the invention is not limited to the precise embodiments described, and that various modifications may be practiced within the scope of the invention defined by the appended claims.

I claim:

1. A positioning mechanism for positioning in a direction of movement, the positioning mechanism comprising:
    a substrate in which are defined elements including:
        a first member including an outward-facing side that extends substantially perpendicular to the direction of movement,
        a second member substantially surrounding the first member and including an inward-facing side facing, and substantially parallel to, the outward-facing side of the first member and separated therefrom by an elongate gap, and
        suspension springs extending between the first member and the second member to mount the second member and the first member relative to one another in a manner that permits movement in the direction of movement and resists movement in directions perpendicular to the direction of movement; and
    an elongate bending element including two end portions, the bending element being located in the gap and extending parallel thereto the end portions of the elongate bending element being attached to one of the first member and the second member and a portion of the elongate bending element other than the end portions being coupled to the other of the first member and the second member, the elongate bending element bending lengthways in response to an applied driving signal to move the first member relative to the second member in the direction of movement.

2. The positioning mechanism of claim 1, in which the elongate bending element includes one of a bimorph bending element, a bimetallic element and a shape-memory alloy.

3. The positioning mechanism of claim 1, in which the elongate bending element includes a shim sandwiched between two elongate pieces of piezoelectric material, the elongate pieces of piezoelectric material having opposite directions of polarization relative to the shim.

4. The positioning mechanism of claim 1, in which:
    the first member additionally includes an additional outward-facing side parallel to the outward-facing side;
    the second member additionally includes an additional inward-facing side facing, and substantially parallel to.

the additional outward-facing side of the first member, and separated therefrom by an elongate additional gap;

the positioning mechanism additionally comprises an additional elongate bending element located in the additional gap and extending parallel thereto to clamp the first member between the elongate bending element and the additional elongate bending element; and the elongate bending element and the additional elongate bending element operate as a complementary pair to move the first member relative to the second member in the direction of movement.

5. The positioning mechanism of claim 1, in which the substrate includes one of silicon, silicon dioxide, sapphire, lithium niobate and gallium arsenide.

6. The positioning mechanism of claim 4, additionally comprising a flexible beam extending between the one of the first member and the second member and the elongate bending element to couple the one of the first member and the second member to the elongate bending element, the flexible beam having a substantially lower compliance than the suspension springs in the direction of movement and having a substantially higher compliance than the suspension springs in the directions orthogonal to the direction of movement.

7. The positioning mechanism of claim 1, additionally comprising a flexible beam extending between the one of the first member and the second member and the elongate bending element to couple the one of the first member and the second member to the elongate bending element, the flexible beam having a low compliance in the direction of movement and a high compliance in directions orthogonal to the direction of movement.

8. The positioning mechanism of claim 1, in which:

the direction of movement, the elongate bending element, the gap, the applied driving force and the suspension springs are a first direction of movement, a first elongate bending element, a first gap, a first applied driving force and first suspension springs, respectively;

the positioning mechanism is additionally for positioning in a second direction of movement, orthogonal to the first direction of movement;

the second member additionally includes an outward-facing side substantially orthogonal to the inward-facing side thereof;

the elements defined in the substrate additionally include:
  a third member substantially surrounding the second member and including an inward-facing side facing, and substantially parallel to, the outward-facing side of the second member and separated therefrom by an elongate second gap, and
  second suspension springs extending between the second member and the third member to moveably mount the third member and the second member relative to one another; and the positioning mechanism additionally comprises a second elongate bending element including two end portions, the second bending element being located in the second gap and extending parallel thereto, the end portions of the second bending element being attached to one of the second member and the third member and a portion of the second bending element outside the end portions being coupled to the other of the second member and the third member, the second bending element bending lengthways in response to a second applied driving signal to move the second member relative to the third member in the second direction of movement.

9. The positioning mechanism of claim 8, in which the first and second elongate bending element each include a shim sandwiched between two elongate pieces of piezoelectric material, the elongate pieces of piezoelectric material having opposite directions of polarization relative to the shim.

10. The positioning mechanism of claim 8, in which:

the first member additionally includes an additional outward-facing side parallel to the outward-facing side thereof;

the second member additionally includes an additional inward-facing side facing, and substantially parallel to, the additional outward-facing side of the first member, and separated therefrom by an elongate additional first gap;

the positioning mechanism additionally comprises an additional first elongate bending element located in the additional first gap and extending parallel thereto to clamp the first member between the first elongate bending element and the additional first elongate bending element; and the first elongate bending element and the additional first elongate bending elements operate as a complementary pair to move the first member relative to the second member in the first direction of movement.

11. The positioning mechanism of claim 8, in which the substrate includes one of silicon, silicon dioxide, sapphire, lithium niobate and gallium arsenide.

12. The positioning mechanism of claim 8, additionally comprising:

position sensor means for generating a position indicating signal representing a position of one of the first member, the second member and the third member in one of the first direction of movement and the second direction of movement; and position control means for generating the driving signal applied to the one of the first elongate bending element and the second elongate bending element in response to position control data and the position indicating signal generated by the position sensor means.

13. The positioning mechanism of claim 12, in which:

the suspension springs each include a surface; and the position sensor means includes a conductive track formed on the surface of at least one of the suspension springs to conduct a position detection signal from the first member to the second member.

14. The positioning mechanism of claim 1, additionally comprising:

position sensor means for generating a position indicating signal representing a position of one of the first member and the second member; and position control means for generating the driving signal applied to the elongate bending element in response to position control data and the position indicating signal generated by the position sensor means.

15. The positioning mechanism of claim 14, in which:

the suspension springs each include a surface; and the position sensor means includes a conductive track formed on the surface at least one of the suspension to conduct position detection signals from the first member to the second member.

16. The positioning mechanism of claim 14, in which:

the position control means includes:
  a D/A converter that receives the position control data and generates an analog position control signal in response thereto, an error amplifier that generates a difference signal proportional to a difference between the position control signal generated by the D/A converter and the position indicating signal generated by the position sensor means, and a drive amplifier that amplifies the difference voltage generated by the error amplifier to generate the drive voltage applied to the elongate bending element; and the position control means controls the position of the one of the first member and the second member so that the difference signal generated by the error amplifier is maintained at zero.

17. The positioning mechanism of claim 1, in which:

the first member includes a flat major surface parallel to the direction of movement; and the positioning mechanism constitutes part of a memory device that additionally includes:

a memory medium located on the flat major surface, a probe substrate disposed opposite the memory medium, the probe substrate including a probe having a probe tip disposed so that the probe tip is separated from the memory medium by a distance in the range of zero to 100 nm, and read/write circuit means for writing data in and reading data from the memory medium using the probe tip.

18. The positioning mechanism of claim 17, in which:

the suspension springs each include a surface; and the memory device additionally includes a conductive track formed on the surface of at least one of the suspension springs between the memory medium and the read/write circuit means.

19. The positioning mechanism of claim 17, in which the memory medium comprises a thin film of one of a ferroelectric material, a ferromagnetic material and a functional organic material.

20. The positioning mechanism of claim 1, in which:

the first member includes a flat major surface disposed parallel to the direction of movement; and the positioning mechanism additionally includes:

a substrate attached to the second member and having a major surface disposed opposite the major surface of the first member, and the suspension springs extend between the first member and the second member to support the first member with the major surface thereof separated from the major surface of the substrate by a gap of less than two microns.

* * * * *